Jan. 5, 1971
R. L. GOUILLOU
3,553,582
METHOD AND APPARATUS FOR MEASURING A TIME INTERVAL
Filed Jan. 19, 1968
2 Sheets-Sheet 1
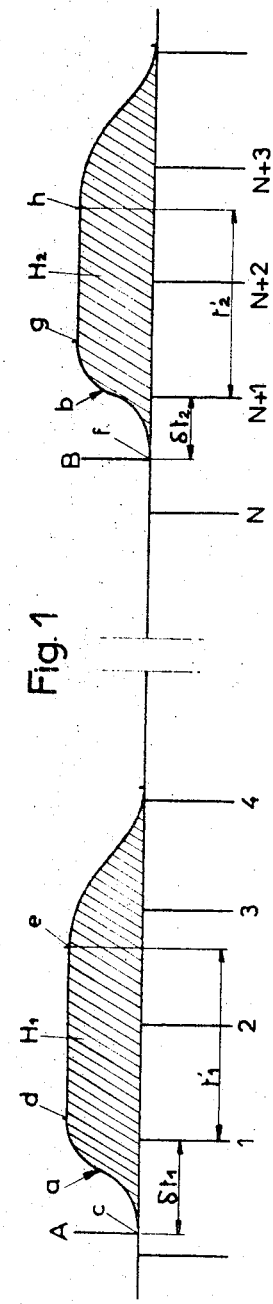
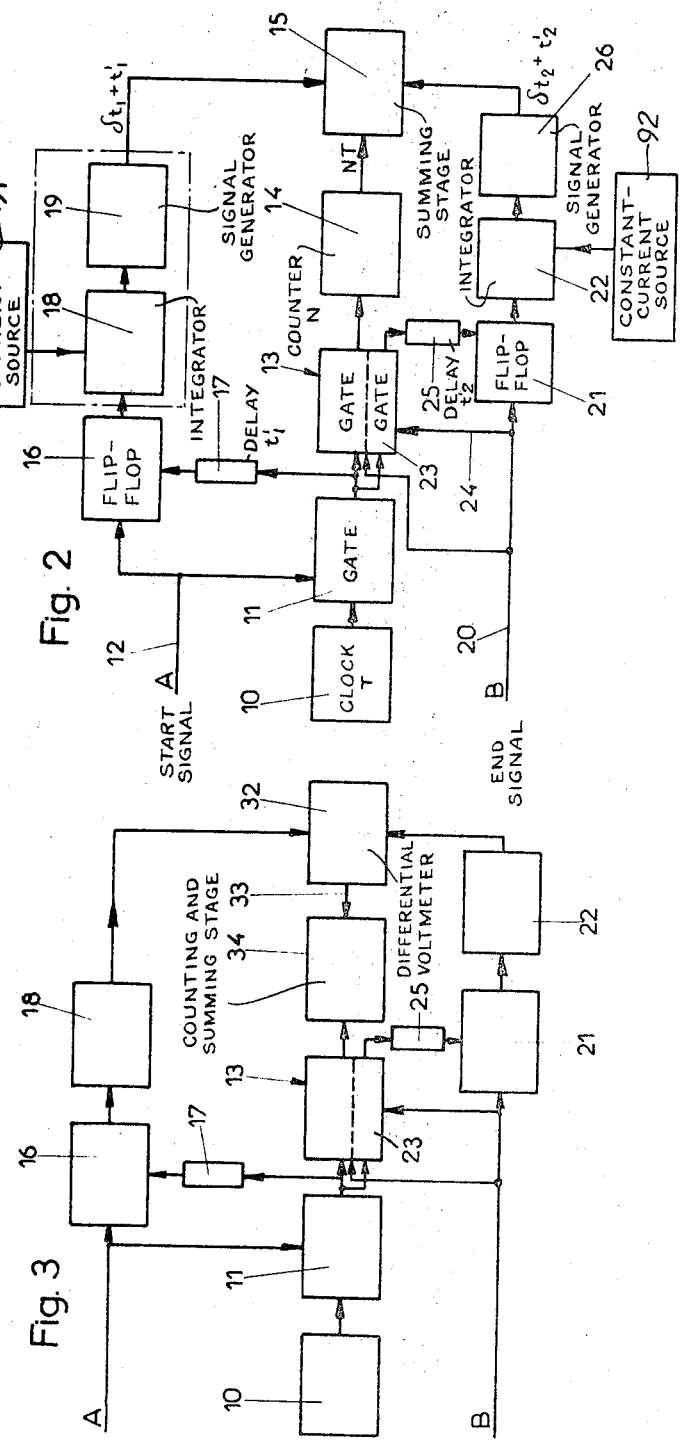
Roger, Louis GOUILLOU
Inventor.
*Karl J. Ross*
Attorney

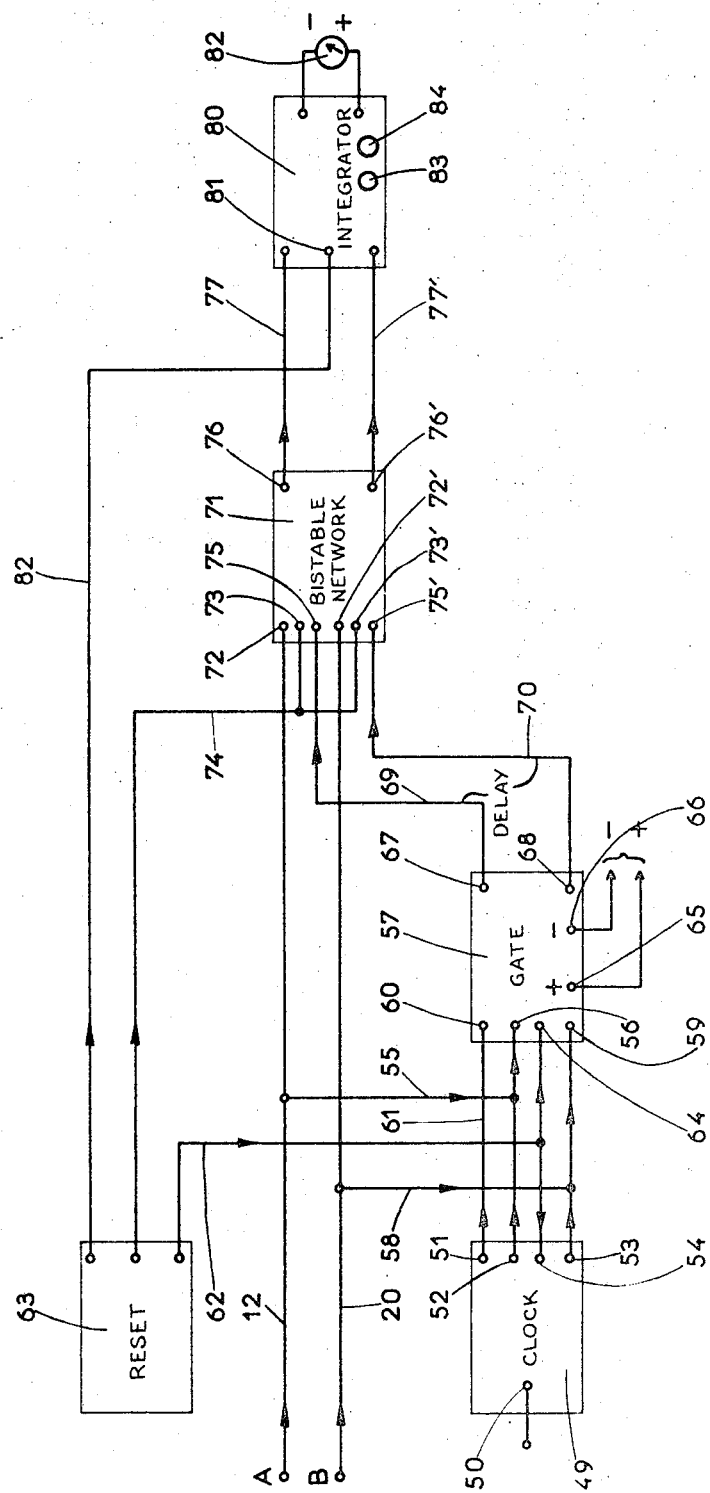

United States Patent Office

3,553,582
Patented Jan. 5, 1971

3,553,582
METHOD AND APPARATUS FOR MEASURING A TIME INTERVAL
Roger L. Gouillou, Draveil, France, assignor to Office National d'Etudes et de Recherches Aerospatiales, Chatillon-sous-Bagneux, France
Filed Jan. 19, 1968, Ser. No. 699,101
Claims priority, application France, Jan. 24, 1967, 92,276
Int. Cl. G04f 9/00
U.S. Cl. 324—186                                11 Claims

ABSTRACT OF THE DISCLOSURE

To measure the time elapsed between a start signal and an end signal, periodically recurrent clock pulses are counted, beginning with a first pulse immediately following an initial clock cycle bracketing the end signal. The residual fractions of the initial and final clock cycles are measured by a pair of integrating chronometers, or by a differential integrator, in which a current flow is triggered on by the occurrence of either signal and is cut off a predetermined period after the next-following clock pulse, the length of this period being greater than the period of instability at the beginning of the current flow.

---

This invention relates to a method and apparatus for measuring a time interval or duration.

There are two very common methods used to measure a duration of a phenomenon. In the first or integrating method, the substantially constant flow of a medium is triggered on by a start-of-phenomenon signal and stopped by an end-of-phenomenon signal, the time interval between the two signals being measured by the amount of medium passing a given point. This method cannot be used to read—at least in the simple manner described—any time less than the time required for the flow to become constant. On the other hand, for times greater than the time required for the flow to become constant the integrating method has a substantially unlimited resolving power—i.e., ability to distinguish between two time intervals which differ from one another very slightly.

In the second or counting method, a time base or clock is used which delivers pulses at regular intervals, and the pulses are counted starting from the pulse immediately following the start-of-phenomenon signal until the pulse immediately preceding the end-of-phenomenon signal. Electronic clocks which deliver pulses with a very stable frequency can be constructed and so the counting method is accurate, but the resolving power is limited by the highest possible frequencies which can be used in such a clock, inter alia because of the transit times of some of its electronic components; consequently, the counting method cannot provide a resolving power better than of the order of 10 nanoseconds.

In an effort to obviate this disadvantage, instead of the signals of a continuously operating electronic clock being counted, the start-of-phenomenon signal is used to start a first clock, and the end-of-phenomenon signal is used to start a second clock whose frequency differs slightly from the frequency of the first clock; the pulses from the first clock are counted until the pulse immediately preceding the end signal, and, similarly to vernier measurements of dimensions, the number of pulses then delivered by the first clock are counted until one of the first clock pulses coincides exactly with a pulse from the second clock.

The first count measures, as it were, the "whole-number" part of the period to be measured—i.e., that part of such period which comprises a whole number of pulses—and the second count determines the fractional part.

The systems hitherto suggested for carrying the latter method into practice, aside from being of very complex construction, may be inaccurate for the measurement of long time intervals, for the very nature of the method of measurement is such that instant-starting clocks must be used, and the long-term stability of such clocks is much less than the long-term stability of continuously operating clocks.

Another way of measuring a time interval is to count the number of pulses of a timer from the first pulse following the start signal until the pulse immediately following the end signal and to use integration to determine the time interval between the start signal and the first counted pulse and the time interval between the end signal and the pulse immediately thereafter.

In this method integration is used to determine very short time intervals which are often less than the time required for the stabilization, which is being integrated.

It is an object of this invention to provide a method which can be used to measure a time interval with a substantially unlimited resolving power and which has the same accuracy as the best conventional electronic clocks.

It is another object of the invention to provide an apparatus which is of simple construction and which uses conventional electronic clocks.

It is another object of the invention to provide a process and apparatus which obviates the disadvantages of the prior-art methods and devices.

The invention provides a method of measuring a time interval wherein a number of pulses or the like delivered by a time are counted beginning with the first pulse after the start signal until the pulse immediately after the end signal, the period from the start signal to the first counted pulse and the period from the end signal to the pulse counted immediately thereafter being measured by an integrating method; each of these periods is determined by measuring the time interval resulting from the augmentation of the respective period by a constant length of time.

An apparatus according to the invention is of use with advantage in systems which determine distances by measuring the transit time of radio or light pulses, such as: radar, clock-based trajectographs, laser telemeters, and the like.

In the following description given by way of example, reference will be made to the accompanying drawing wherein:

FIG. 1 is a time diagram showing a series of clock pulses, two signals marking the start and the end of an event to be timed, and the flow of a measuring current initiated by these signals;

FIG. 2 is a block diagram of a first embodiment of the invention;

FIG. 3 is a block diagram of a second embodiment of the invention; and

FIG. 4 is a circuit diagram of another apparatus according to the invention.

To measure a time interval between a start-of-phenomenon signal A, hereinafter called simply a start signal, and an end-of-phenomenon signal B, hereinafter simply called an end signal, the signal A is used to initiate the counting of pulses 1, 2 etc. (FIG. 1) delivered by an internal times such as an electronic clock which can provide a stability suitable for the duration of the time interval to be measured and which can be e.g. a quartz clock or an atomic clock. A time interval $\delta t_1$ separates the first counted pulse from the signal A.

The signal A is also used to start an integrating a chronometer, the curve $a$ representing by way of example the rate of flow of an electric current. From the point $c$ corresponding to the signal A the flow rate increases progressively and temporarily, to become constant at a point $d$.

According to the invention, the current throughflow is interrupted when a certain time, appreciably greater than the time required for the flow to become constant, has gone by after the clock pulse 1. To this end, according to the invention, the pulse 1 is applied as a stop signal to the integrating chronometer via a delay line. If the same introduces a delay of $t'_1$, the curve $a$ starts to approach the abscissa axis after the point $e$, corresponding to the abscissa position $\delta t_1 + t'_1$, at a rate depending upon the operating characteristics of the integrating chronometer, the approach of the curve $a$ to the abscissa axis being along a slope which is very similar to the flow increase slope but opposite thereto with reference to a perpendicular to the abscissa.

Like the signal A, the end signal B has two purposes, i.e. to make it possible to count the number of pulses starting from the pulse 1 until the pulse N immediately preceding the signal B, and to start a second integrating chronometer for which a curve $b$ representing the flow rate starts to rise from zero at the point $f$, the same coinciding with the signal B, and levels off to a constant value at a point $g$. According to the invention, the second integrating chronometer does not measure the time interval $\delta t_2$ between the signal B and the pulse $(N+1)$, but determines the time interval between the signal B and the point of time which trails the end of said time interval by a constant time $t'_2$; from a point $h$ on the curve $b$ corresponding to an abscissa position $\delta t_2 + t'_2$ the flow rate decreases to zero. As more fully described hereinafter, the pulse $(N+1)$ immediately following the end signal B is applied via a delay line to the second chronometer curves $a$ and $b$ are shown to be of identical shape.

Hatched areas $H_1$, $H_2$ represent the integrated values of the analog signals delivered by the first and second chronometers, respectively. Both these values are delivered without any limit on resolution and are functions of constant terms $k_1$, $k_2$ corresponding to the transit times of the components of the two chronometers.

If T denotes the period of the times, the counting of the number of clock pulses provides a basic signal of magnitude NT.

The first integrating chronometer delivers the analog of a period:

$$\delta t_1 + t'_1 + k_1$$

wherein the first term corresponds to the fraction of the first clock cycle measured between start signal A and pulse 1.

The second integrating chronometer delivers $$\delta t_2 + t'_2 + k_2$$

wherein the first term corresponds to the fraction of the last clock cycle measured between end signal B and pulse $N+1$.

According to the invention, the following summing operation is performed:

$$NT + (\delta t_1 + t'_1 + k_1) - (\delta t_2 + t'_2 + k_2)$$

so that, for a constant term equal to $(t'_1 + k_1) - (t'_2 + k_2)$, there is measured an interval $$NT + \delta t_1 - \delta t_2$$

which is exactly the time interval between the signal B and the signal A. The magnitude of this time interval can be obtained directly by previous calibration, introducing the constant:

$$(t'_1 + k_1) - (t'_2 + k_2)$$

An apparatus for carrying the method according to the invention into effect has the advantage of conventional times—i.e., constancy of pulse frequency—without their disadvantage—i.e., the inability to measure a fraction of a period—and has the further advantages of integrating chronometers i.e.—unlimited resolution—without their limitation—i.e., the inability to measure long durations accurately.

An apparatus according to the invention will now be described.

As can be seen in FIG. 2, the apparatus comprises an internal times or clock 10 whose pulses are applied at a cadence T to the input of a gate 11. The start signal A is applied to the gate 11 by a line 12 and opens the gate 11, which is initially closed. The gate 11 therefore passes the clock pulses to an initially open gate 13 through which such pulses go to a counter 14 where they are counted. The counted pulses are therefore the pulses delivered by the clock 10 starting with the timing pulse 1 immediately following the start signal A. The counting result is applied to a summing stage 15.

The start signal A is also applied to a flip-flop 16 and changes the same over, e.g. from the "0" state to the "1" state. The output of gate 11 is also delivered to the flip-flop 16 but via a delay line 17 which introduces a delay $t'_1$, so that the flip-flop 16 receives the first pulse delivered by clock 10 not at a time-interval $\delta t_1$ after the signal A but after a further constant interval $t'_1$ introduced by the delay line—i.e, at a time $(\delta t_1 + t'_1)$ after the signal A. The latter pulse returns the flip-flop 16 to its zero state.

Flip-flop 16 controls the operation of an integrator 18 which causes the flow constant measuring current (except at the start and end of the flow) but which is operative only when the flip-flop 16 is in its "1" state, thus during the time interval $(\delta t_1 + t'_1)$. The integrator 18 can comprise a capacitance which is charged by a constant current from a source 91 when the flip-flop 16 is set. Following the integrator 18 there is a signal generator 19 which delivers an output proportional to the integrated flow as stored on such a capacitor—i.e., to $$(\delta t_1 + t'_1 + k_1)$$

where the term $k_1$ represents the period of instability at the beginning and the end of the flow.

The output from generator 19 also goes to the arithmetic unit 15.

The end signal B is applied via a line 20 to the gate 13 and closes the same. The gate 13 therefore stays open for a time which enables the counter 14 to count N pulses or clock cycles and so the counter output measures the interval NT.

The end signal B is also applied to a second flip-flop 21, initially in the "0" state, to change the same over into the "1" state. Such changeover brings into operation a second integrator 22 generating another current flow which is constant except in the period of instability at the start and the end of the cycle. The corresponding current sources has been diagrammatically illustrated at 92.

The gate circuit 13 is associated with a second gate 23 which initially closed but which is opened by the arrival of the end signal B via a line 24. Once the auxillary gate 23 is opened, the clock pulse which immediately follows the end signal B and which is therefore the $(N+1)$th pulse can be applied to the flip-flop 21 via a delay line 25 introducing a delay $t'_2$. The arrival of the $(N+1)$th pulse resets the flip-flop 21. The integrator 22 is therefore operative during the time $(\delta t_2 + t'_2)$ during which the flip-flop 21 is set, i.e. remains in the "1" state. The magnitude of the flow integrated during such time interval is present at the output of a signal generator 26 and is applied to the circuit 15 which performs the aforementioned summing operation:

$$NT + (\delta t_1 + t'_1 + k_1) - (\delta t_2 + t'_2 + k_2)$$

As a result of previous calibration, the summing stage 15 gives a direct output of $$NT + \delta t_1 - \delta t_2$$

which is the required duration $\Delta t$ between the start signal A and the end signal B.

Advantageously, the delay lines 17, 25 introduce equal delays to cancel the term $t'_1$ and $t'_2$ in the above equation.

The transit times associated with the integrating chronometer components do not affect the measurement.

An apparatus according to the invention using conventional flip-flop having a transist time on the order of 10 nanoseconds can be used to measure a time interval to an accuracy of 1 nanosecond.

Because of the relatively low values of $(\delta t_1 + t'_1)$ and $(\delta t_2 + t'_2)$, the devices 19, 26 can be numerical voltmeters yielding two or at most three significant figures.

FIG. 3 is a diagram for a modification. The latter is substantially identical with the embodiment hereinbefore described yet the outputs of the integrators 18, 22 are applied to a single voltmeter 32 comprising a differential amplifier which delivers at its output 33 the difference between the voltages generated in the integrators 18, 22. The circuit for the integrated voltage output delivered by the integrator 18 comprises then a register which stores the integrated voltage until the end of the time interval to be measured.

The summing stage 34 receives, on the one hand, pulses going through the main gate 13 and acts as a counter therefor; the device 34 also receives, on the other hand, the difference between the integrated voltages and serves as an arithmetic unit for performing the above-mentioned operation:

$$NT + (\delta t_1 + t'_1 + k_1) - \delta t_2 + t'_2 + k_2)$$

The unit 34 has been calibrated by means of a compensating voltage to allow for the time delays $t'_1$, $t'_2$ introduced by the delay lines 17, 26 respectively and to allow for the unstable starting and stopping condition in the integrators 18, 22 so that the time interval to be measured can be obtained directly, the slight delay in obtaining the result not being a disadvantage in practice.

The apparatus according to the invention also comprises the auxiliary equipment conventionally associated with any chronometer, such as the means for resetting the several components thereof.

Reference is now made to FIG. 4 which shows a further embodiment of a chronometer according to the invention.

In this embodiment the timer 49 has an input 50 to which a high-frequency signal—of 5 mHz. in this particular example—is applied. The time base 49 also has four terminals 51–54; the terminal 51 serves for sampling very short alternately positive and negative pulses forming a square 10 mHz. signal obtained from the input signal by a doubler. The positive pulses define 100-nanosecond time intervals.

Calibrating signals strictly in phase with the signals sampled at the terminal 51 can be sampled at the output terminals 52, 53, and a zeroizing signal from a resetting stage 63 can be applied to the terminal 54.

A conductor 55 connects terminal 52 to the line 12 receiving the start signal A and to an input 56 of a gate circuit 57. A conductor 58 connects terminal 53 to the line 20 which receives the end signal B and to an input 59 of the gate circuit 57. The latter has an input 60 connected by a conductor 61 to the output 51 of the clock circuit 49. The conductor 62 extending from the zero-resetting stage 63 to the timer terminal 54 also connects the unit 63 to an input 64 of the gate circuit 57. Output terminals 65, 66 thereof deliver a square signal to an associated counter, and output terminals 67, 68 deliver the short pulses from the time base 49 via respective coaxial cables 69, 70 to a bistable network 71. The coaxial cables 69, 70 form the delay elements; they are more than 20 meters long and introduce a delay of more than 100 nanoseconds.

The bistable device 71 has two identical series of three output terminals. A first series comprises a start-signal input terminal 72 connected to line 12, a terminal 73 connected by a conductor 74 to the resetting stage 63, and a terminal 75 to which the short pulses from the output 67 of the gate circuit 57 are applied via the coaxial cable 69. The second series of terminals comprises a terminal 72' receiving the end signal B from line 20, a terminal 73' receiving a zero-setting signal from the unit 63 via the conductor 74, and a terminal 75' receiving short pulses from the terminal 68 of gate circuit 57 via the coaxial cable 70.

Bistable device 71 is formed by a combination of two identical flip-flops one having an output 76 and the other having an output 76'. The two outputs are connected by conductors 77, 77', respectively, to the inputs of a differential integrator 80 which also has a terminal 81 connected by a conductor 82 to the resetting stage 63. The integrator 80 has means 83 for so adjusting its output that when the times read by the flip-flops are identical it gives a zero indication to a read-out device 82.

The chronometer shown in FIG. 4 is calibrated as follows:

When a first calibrating button (not shown) of the timer 49 is operated, a ladder signal is produced at the terminal 52 at exactly the same time as a very brief positive pulse is present at the output 51. A second calibrating button (not shown) is then operated to produce a positive ladder pulse at the output 53. The positive ladder pulses appearing first at the output 52 and then at the output 53 are accurately synchronized with a positive timer pulse present at the output 51. However, because of the delay in the gate circuit 57, the pulse released to the network 71 is the pulse following the last-mentioned positive clock pulse. The bistable network 71 is required to read two identical time intervals each of 100 nanoseconds However, the output voltage of the integrator 80 is often other than zero, and the member 83 of the integrator must be operated to adjust its voltage so that after the unit 63 has been operated and the calibrating buttons have been set, the read-out instrument 82 following the integrator gives a zero indication.

The coaxial cable 69 connecting output 67 of gate 57 to input 65 of bistable device 71 is then shortened by an amount corresponding to 100 nanoseconds of delay (about 20 meters). The two flip-flops which together form the device 71 then read two time intervals which differ from one another by 100 nanoseconds, and the read-out device 82 is adjusted to indicate $+100$.

The coaxial cable 69 is then restored to its original length and the coaxial cable 70 is shortened by an amount (approximately 20 meters) such as to introduce a delay of 100 nanoseconds. After operation of the zero-setting unit 63 the calibrating buttons are adjusted, and the read-out device 82 should then indicate $-100$. If it does not do so, the flow rate of the intergrators is adjusted by an adjusting member 84 and calibration is restarted.

On completion of calibration the counter is ready for use.

I claim:

1. A method of measuring the time elapsed between a start signal and an end signal, comprising the steps of:
   generating periodically recurrent clock pulses;
   beginning a count of said clock pulses with a first clock pulse 1 immediately following said start signal A;
   terminating said count upon the occurrence of said end signal B;
   triggering a first current flow upon the occurrence of said start signal A and integrating its magnitude;
   cutting off said first current flow a predetermined first period $t'_1$ after said first clock pulse 1;
   triggering a second current flow upon the occurrence of said end signal B and integrating its magnitude;
   cutting off said second current flow a predetermined period $t'_2$ after a last clock pulse N+1 immediately following said end signal, said periods $t'_1$, $t'_2$ being long enough to enable stabilization of the respective flow rates;

converting the integrated first current flow into a first analog value representing a function $\delta t_1$ of the fraction of said first clock cycle elapsed between said start signal A and said first clock pulse 1;

converting the integrated second current flow into a second analog value representing a function $\delta t_2$ of the fraction of said last clock cycle elapsed between said end signal B and said last clock pulse N+1;

multiplying the length of a clock cycle T by the pulse count N to obtain a time interval NT approximating the length of time to be measured;

and augmenting said time interval NT by the difference between said first analog value $\delta t_1$ and said second analog value $\delta t_2$ to provide an exact measure of such time.

2. A method as defined in claim 1 wherein said periods $t'_1$ and $t'_2$ are alike and said current flows have identical waveforms.

3. A system for measuring the time elapsed between a start signal and an end signal, comprising:

timer means for generating a train of periodically recurrent clock pulses;

counter means connected to receive said clock pulses;

first circuit means responsive to a start signal for initiating the transmission of clock pulses from said timer means to said counter means;

second circuit means responsive to an end signal for terminating such transmission;

first control means responsive to said start signal for initiating a first current flow;

first delay means connected to receive from said timer means a first pulse transmitted to said counter means and for delivering said first pulse to said first control means with a predetermined lag sufficient to allow said first current flow to become stabilized, said first control means being responsive to the delayed first pulse for terminating said first current flow;

second control means responsive to said end signal for initiating a second current flow;

second delay means connected to receive from said timer means a last pulse generated upon termination of transmission to said counter means and for delivering said last pulse to said second control means with a predetermined lag sufficient to allow said second current flow to become stabilized, said second control means being responsive to the delayed last pulse for terminating said second current flow;

integrating means responsive to said first and second control means for providing an analog signal proportional to the difference of the cumulative magnitudes of said first and second current flows;

and summing means connected to said counter means for receiving therefrom a basic signal proportional to the count of said clock pulses, said summing means being further connected to said integrating means for additively combining said basic signal with said analog signal.

4. A system as defined in claim 3 wherein said first circuit means comprises first gate means connected in the output of said timer means, said second circuit means comprising second gate means connected in the output of said first gate means.

5. A system as defined in claim 4 wherein said first control means comprises a first flip-flop settable by said start signal and resettable by said delayed first pulse, said second control means comprising a second flip-flop settable by said end signal and resettable by said delayed last pulse.

6. A system as defined in claim 5 wherein said first delay means is connected to the output of said first gate means, said second delay means being connected to the output of said second gate means.

7. A system as defined in claim 6 wherein said second gate means comprises a normally closed main gate, inserted between said first gate means and said counter means, and a normally open ancillary gate, inserted between said first gate means and said second delay means, said main and ancillary gates being respectively openable and closable by said end signal.

8. A system as defined in claim 5 wherein said integrating means comprises a first and a second integrator respectively actuatable by said first and second second flip-flop in the set condition thereof.

9. A system as defined in claim 8 wherein said summing means has a pair of inputs respectively connected to the outputs of said first and second integrators.

10. A system as defined in claim 9 wherein said summing means comprises a differential voltmeter.

11. A system as defined in claim 3 wherein said first and second delay means comprise a pair of coaxial lines.

References Cited

UNITED STATES PATENTS 3,376,504   4/1968   Chick _____ 324—68(D)

OTHER REFERENCES

Baron, "The Vernier Time Measuring Technique" Proceedings of the I.R.E., January 1957, pp. 21–29.

ALFRED E. SMITH, Primary Examiner